United States Patent [19]

Furutsu

[11] Patent Number: 5,146,143
[45] Date of Patent: Sep. 8, 1992

[54] VIBRATION WAVE DRIVEN MOTOR

[75] Inventor: Etsuro Furutsu, Kawasaki, Japan

[73] Assignee: Canon Kabushiki Kaisha, Tokyo, Japan

[21] Appl. No.: 752,966

[22] Filed: Aug. 29, 1991

Related U.S. Application Data

[63] Continuation of Ser. No. 382,487, Jul. 21, 1989, abandoned.

[30] Foreign Application Priority Data

Jul. 26, 1988 [JP] Japan ................................ 63-186439

[51] Int. Cl.$^5$ ............................................ H01L 41/08
[52] U.S. Cl. ...................................... 318/116; 310/316
[58] Field of Search ............... 310/316, 317, 323, 328; 318/116, 118

[56] References Cited

U.S. PATENT DOCUMENTS

| 4,727,276 | 2/1988 | Izukawa et al. ............... 310/323 X |
| 4,743,788 | 5/1988 | Takagi et al. ................. 310/323 X |
| 4,748,365 | 5/1988 | Poupaert et al. .................. 310/316 |
| 4,749,896 | 6/1988 | Suzuki et al. ................. 310/323 X |
| 4,794,294 | 12/1988 | Shimizu et al. .................. 310/316 |
| 4,833,358 | 5/1989 | Suzuki et al. ................. 310/323 X |
| 4,853,578 | 8/1989 | Takahashi et al. ............ 310/316 X |
| 4,853,579 | 8/1989 | Kawasaki et al. ............. 310/323 X |
| 4,888,514 | 12/1989 | Takahashi et al. ................ 310/316 |
| 4,914,336 | 4/1990 | Yamasaki ........................ 310/316 |
| 4,914,337 | 4/1990 | Takagi ............................ 310/316 |
| 4,926,084 | 5/1990 | Furutsu et al. .................. 310/316 |
| 4,952,834 | 8/1990 | Okada ............................. 310/316 |
| 4,954,741 | 9/1990 | Furutsu et al. .................. 310/316 |
| 4,954,742 | 9/1990 | Izukawa .......................... 310/316 |
| 4,998,048 | 3/1991 | Furutsu .......................... 318/116 |
| 5,001,442 | 3/1991 | Hanaie et al. ................ 310/316 X |
| 5,010,222 | 4/1991 | Suganuma .................... 310/316 X |
| 5,013,982 | 5/1991 | Sasaki ............................ 318/116 |
| 5,016,882 | 5/1991 | Takagi ............................ 318/116 |
| 5,023,526 | 6/1991 | Kuwabara et al. ............. 310/316 X |

Primary Examiner—Mark O. Budd
Attorney, Agent, or Firm—Fitzpatrick, Cella, Harper & Scinto

[57] ABSTRACT

In a vibration wave motor, during the actuation of the vibration wave motor during which a detection signal from a vibration detecting electro-mechanical energy converting element is unstable or when the driving voltage is low, driving is effected in the open loop mode which does not use the detection signal, and when the detection signal is stable, driving is effected in the mode which uses the detection signal, i.e., the PLL control mode.

21 Claims, 4 Drawing Sheets

VIBRATION WAVE DRIVEN MOTOR

This application is a continuation of application Ser. No. 07/382,487 filed Jul. 21, 1989, now abandoned.

BACKGROUND OF THE INVENTION

1. Field of the Invention

This invention relates to a driving circuit for a vibration wave motor.

2. Related Background Art

A vibration wave motor for frictionally driving a moving member by the utilization of a travelling vibration wave is recently being put into practical use. The principle of operations of such motor will hereinafter be described with reference to FIG. 3 of the accompanying drawings.

A ring-like vibration member 3 of resilient material whose full peripheral length is an integral number of as great as a certain length $\lambda$, and two groups of piezoelectric elements 4 are arranged circumferentially around thereof and secured to one surface of the vibration member 3 to provide a stator 2. These piezoelectric elements 4, in each group, are arranged at a pitch of $\lambda/2$ and so as to be of expansion-contraction polarity and are also arranged in such a manner that there is a deviation an odd number times as great as $\lambda/4$ between the two groups. Electrode films are provided on the two groups of piezoelectric elements. If an AC voltage is applied only to one group (hereinafter referred to as the A phase), a standing wave (wavelength $\lambda$) of such flexural vibration that the middle point of each piezoelectric element of the A phase and a point spaced, apart by $\lambda/2$ therefrom are the positions of antinodes. The middle point between the positions of the antinodes is the position where a node is produced in the vibration member 3 over the full periphery thereof. If an AC voltage is applied only to the other group (hereinafter referred to as the phase B), a standing wave is produced in a similar manner, but the positions of the antinodes and node deviate by $\lambda/4$ relative to the standing wave. If AC voltages identical in frequency and having a time phase difference $\lambda/4$ therebetween are applied to the A and B phases at the same time, the standing waves of the two are combined together with a result that a travelling wave (wavelength $\lambda$) of flexural vibration travelling in the circumferential direction is produced in the vibration member 3. At this time, each point on the other surface of the vibration member 3 having a thickness effects a kind of elliptical movement. Consequently, if a ring-like moving member as a rotor 1 is brought into pressure contact with said other surface of the vibration member 3, the moving member 1 is subjected to a circumferential frictional force from the vibration member 3 and is rotatively driven. The direction of rotation of the moving member can be reversed by changing over the phase difference between the AC voltages applied to the A phase electrodes 5a and the B phase electrodes 5b of the two A and B phases to the positive or the negative. What has been described above is the epitome of the principle of operation vibration wave motor of this type.

In the vibration wave motor thus constructed, there are two types of control of the number of revolutions of the vibration wave motor, i.e., the system of varying the applied frequencies of the driving AC signals applied to the A phase and the B phase, and the system of varying the voltages of the driving AC signals applied to the A phase and the B phase.

According to the former system of controlling the number of revolutions, as shown in FIG. 5 of the accompanying drawings, there is an abrupt variation in the number of revolutions on the side of the frequency lower than the mechanical resonance frequency of the vibration wave motor, and this leads to numerous problems in stably driving the motor over a wider range of the number of revolutions. The latter system of controlling the number of revolutions has no abrupt point of variation in the number of revolutions as in the former system and therefore, it is a control method suitable for a case where the system is utilized over a wide range of the number of revolutions, and in this case, it is popular that the frequency of the driving AC signal applied to the vibration wave motor is fixed at a mechanical resonance frequency which is highest in driving efficiency.

Now, the mechanical resonance frequency of the vibration wave motor varies for each individual motor and with the temperature during driving. Therefore, the mechanical resonance frequency is not always provided at a fixed frequency.

So, in the vibration wave motor of this type, there has been provided a driving circuit of the PLL control system in which, besides the piezoelectric elements of the A phase and the B phase, a vibration detecting piezoelectric element (hereinafter referred to as the S phase) is secured to the vibration plate. The frequency of the AC voltage applied to the A phase and the B phase is automatically made into a resonance frequency in conformity with the detection output from the S phase electrode 5s of the S phase, whereby the vibration wave motor can be driven most efficiently.

However, in the driving circuit for the vibration wave motor by such PLL control system, as shown in FIG. 4 of the accompanying drawings, the output of the S phase is indefinite during the start of the motor or when the driving voltage is low has led to a case where the PLL control becomes impossible.

SUMMARY OF THE INVENTION

It is an object of the present invention to provide a driving circuit for a vibration wave motor which can accomplish stable control of the number of revolutions even during the actuation of the vibration wave motor or even when the driving voltage is low.

Other objects of the present invention will become apparent from the following detailed description.

DESCRIPTION OF THE PREFERRED EMBODIMENT

Figure 1:
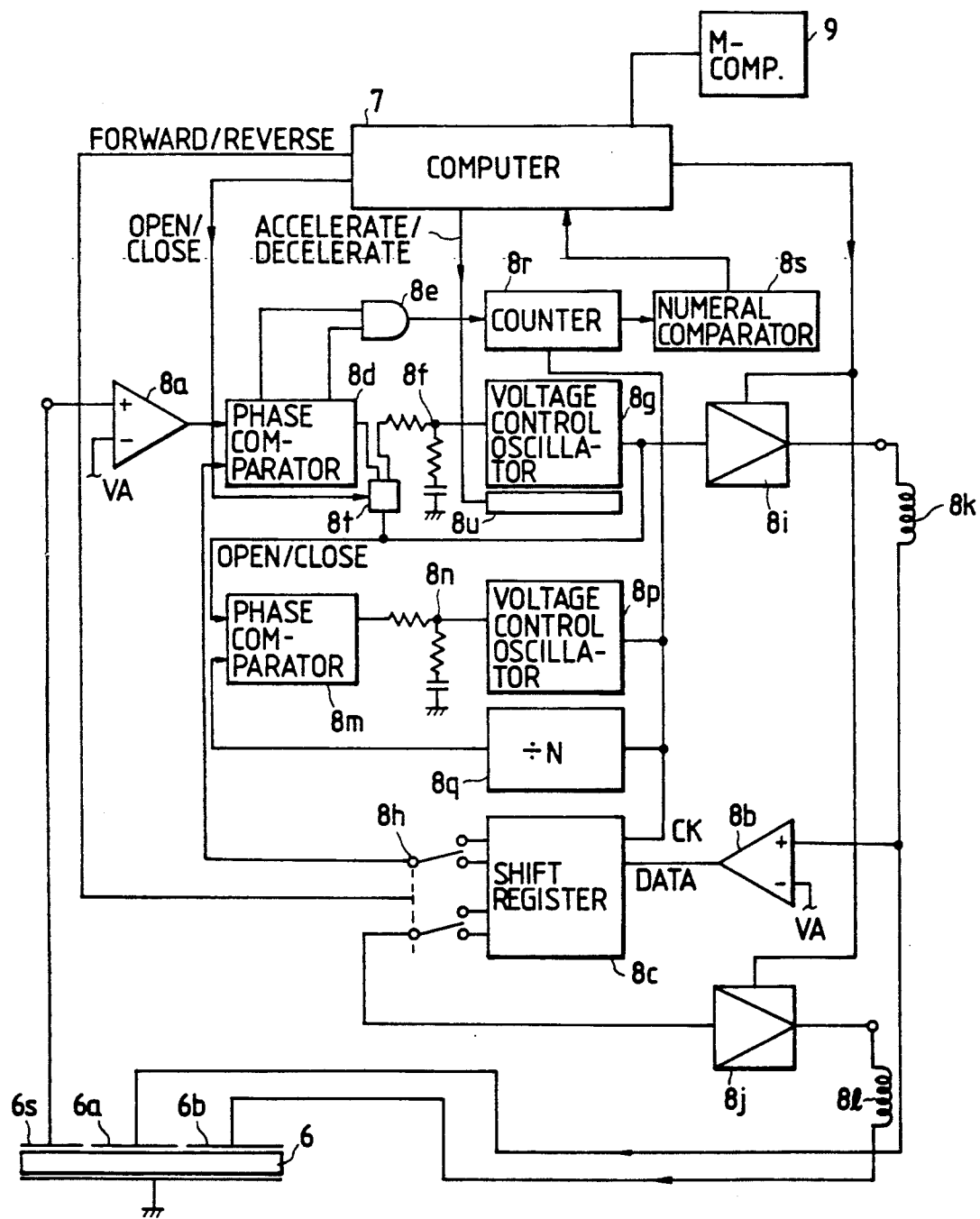
FIG. 1 is a block diagram showing an embodiment of a driving circuit for a vibration wave motor according to the present invention.

The present invention will hereinafter be described with respect to an embodiment thereof shown in the drawings.

FIG. 1 is a block diagram showing an embodiment of a driving circuit for a vibration wave motor according to the present invention. This circuit controls the number of revolutions of the vibration wave motor by a voltage.

Figure 3:
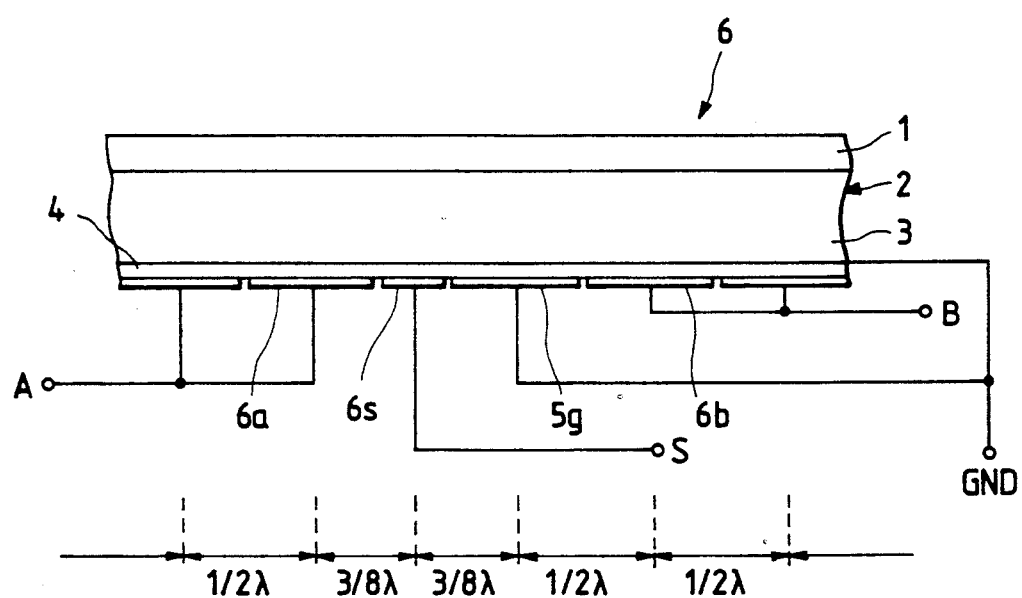
FIG. 3 is a schematic view of a vibration wave motor.
Figure 4:
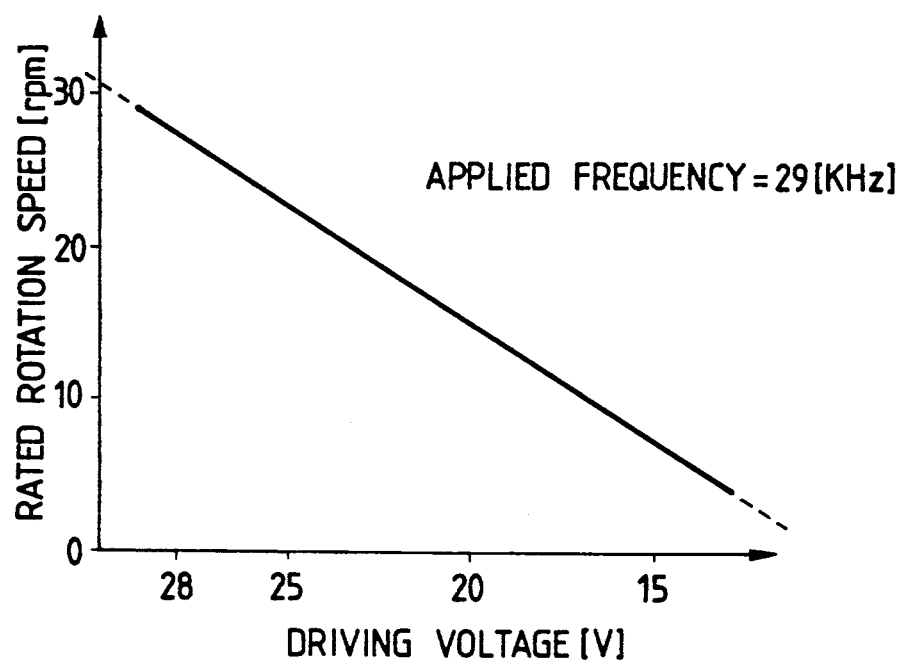
FIG. 4 is a graph showing the voltage vs. number of revolutions characteristic of the vibration wave motor.

The reference numeral 6 designates a vibration wave motor as shown in FIG. 3, the reference numeral 7 denotes a control unit comprising a microcomputer for controlling the driving of the entire circuit, the reference character 8a designates a comparator for the S phase, the reference character 8b denotes a comparator for the A phase, the reference character 8c designates a shift register, the reference characters 8d and 8m denote edge trigger type phase comparators, the reference character 8e designates an AND circuit, the reference characters 8f and 8n denote lag lead filters, the reference characters 8g and 8p designate voltage control oscillators, the reference character 8h denotes a switch for changing over the forward rotation and the reverse rotation, the reference characters 8i and 8j designate variable voltage sources, the reference characters 8k and 8l denote matching coils, the reference character 8q designates an N-order frequency dividing circuit, the reference character 8r denotes a counter circuit, the reference character 8s designates a numerical value comparator, the reference numeral 8t denotes a closed loop/open loop change-over device, the reference character 8u designates a self-running frequency setting device for the voltage control oscillator 8g, the reference numeral 9 denotes control instructing means comprising a microcomputer for instructing the driving/stoppage, forward/reverse rotation and acceleration/deceleration of the vibration wave motor. The output signal of the numerical value comparator 8s is input to the control unit 7, and control signals are output from the control unit 7 to the forward/reverse rotation change-over switch 8h, the closed/open loop change-over-device 8t, the self-running frequency setting device 8u and the variable voltage sources 8i and 8j. The open loop means a mode in which the number of revolutions of the vibration wave motor is controlled without resorting to the signal from the S phase electrode, and the closed loop means a mode in which the number of revolutions of the vibration wave motor is controlled by the signal from the S phase electrode.

The signal from the voltage control oscillator 8g is amplified by the variable voltage source 8i and applied to the electrode 6a of the vibration wave motor through the coil 8k.

A signal shifted by +90° or −90° relative to the signal of the voltage control oscillator 8g is taken out by the shift register 8c which shifts the data of the signal from the A phase comparator 8b by a clock signal N times the oscillation frequency f of the voltage control oscillator 8g, is amplified by the variable voltage source 8j and is applied to the electrode 6b of the vibration wave motor through the coil 8l.

At this time, the forward/reverse rotation change-over switch 8h is operated by the instruction from the control unit 7 and the signal from the shift register 8c is selected, whereby the phase relation between the signals applied between the A phase and the B phase changes and the direction of rotation of the vibration wave motor changes.

Signals resulting from the output of the S phase comparator 8a and the signal from the A phase comparator 8b being shifted by 90° by the shift register 8c are input to the phase comparator 8d. The output pulse of the phase comparator 8d is counted by the counter circuit 8r, and the value thereof is compared with the internal set value by the numerical value comparator 8s, whereby the present phase state can be detected. This is described in detail in Japanese Laid-Open Patent Application No. 63-154074 (laid open on Jun. 27, 1988 . . . corresponding U.S. Application Ser. No. 131,469) and therefore need not be described in detail herein.

Also, by the control unit 7 operating the open loop/closed loop change-over device 8t, the voltage control oscillator 8g effects PLL control so that the output of the phase comparator 8d becomes constant. This is also described in detail in the aforementioned Japanese Laid-Open Patent Application No. 63-154074 and therefore need not be described in detail herein.

Figure 2:
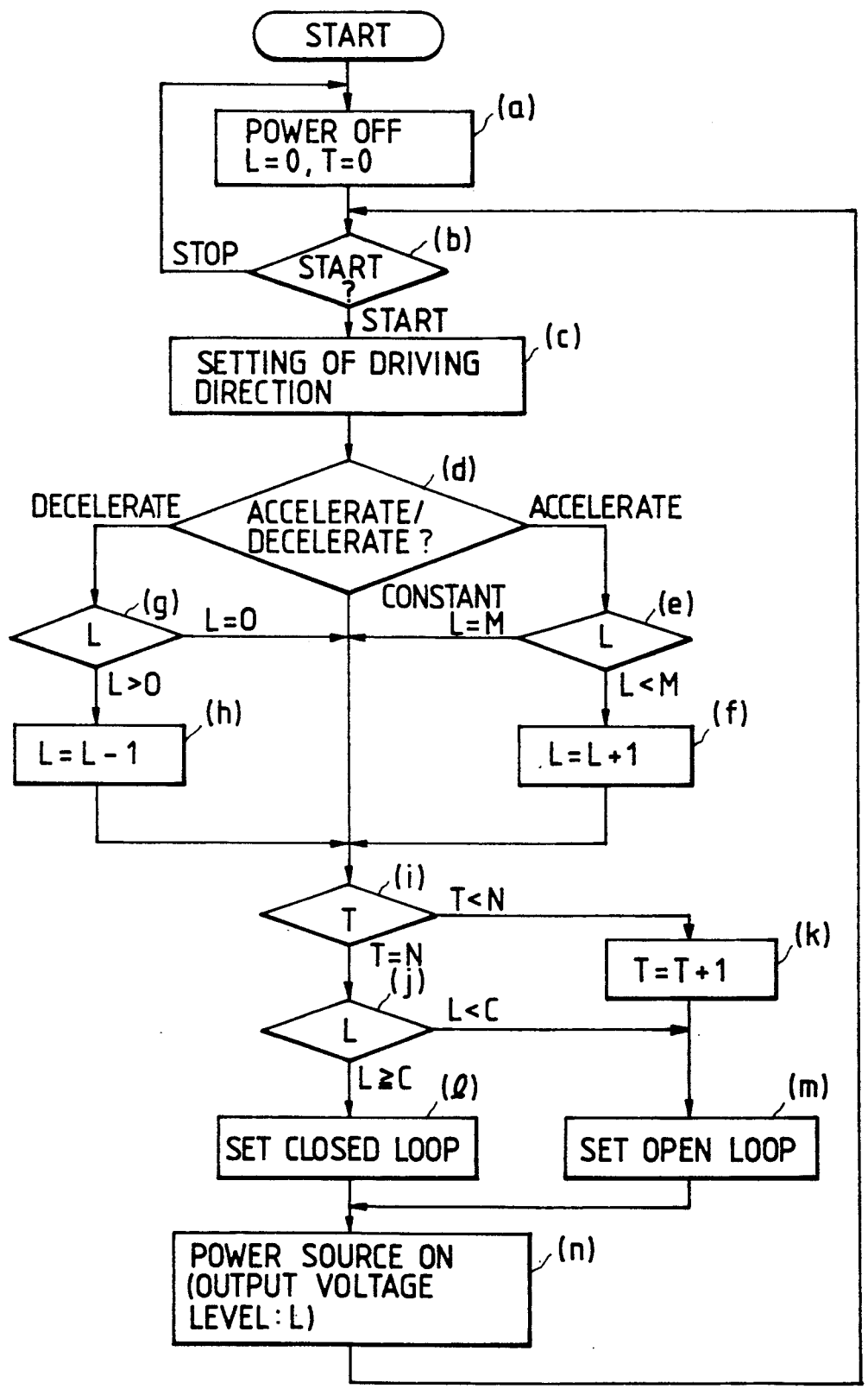
FIG. 2 is a flow chart showing the operation procedure of the driving circuit shown in FIG. 1.

The operation procedure of the control unit 7 will now be described with reference to the steps (a) - (n) of a flow chart shown in FIG. 2.

At step (a), when a signal for starting the system is sent from the control instructing means 9 to the control unit 7, the control unit 7 outputs the instruction of power source off to the voltage sources 8i and 8j of FIG. 1, and renders the output voltage level L of the voltage sources 8i and 8j into L=0 and sets a minimum voltage in the voltage sources 8i and 8j. Also, the value T of a time counter (not shown) provided in the control unit 7 is set to T=0, and the initial state is set.

At step (b), the control unit 7 receives the instruction of the starting/stoppage of driving from the control instructing means 9. If the instruction is the instruction of the starting of driving, the program branches off to step (c), where the process of inputting the direction of driving is carried out. If the instruction is the instruction of the stoppage of driving, the program branches off to step (a), where the initial state is kept.

Description will be continued with it being assumed that in this case, the driving start instruction signal has been given.

At step (c), the control unit 7 further receives the instruction of the direction of driving from the control instructing means 9, and sets the forward/reverse rotation change-over switch 8h.

Description will be continued with it being assumed that in this case, the signal of the instruction of the direction of driving is a signal instructing the forward rotation.

At step (d), the control unit 7 receives the acceleration/deceleration instruction from the control instructing means 9, and if there is no instruction of acceleration/deceleration, this step branches off to step (i), where the aforementioned counter T provided in the control unit 7 is checked up. If there is the instruction of acceleration, the step branches off to step (e), where the acceleration process is carried out, and if there is the instruction of deceleration, the step branches off to step (g), where the deceleration process is carried out.

In this case, the vibration wave motor is in its actuated state and therefore, the control instructing means 9 outputs an acceleration instruction signal. Accordingly, the step proceeds to step (e).

At step (e), the check-up of the level L of the output voltages from the voltage sources 8i and 8j is executed, and if the level L of the output voltages is equal to a maximum voltage level M, the step branches off to step (i), and if L<M, the step branches off to step (f), and in this case, the vibration wave motor is in its actuated state as previously mentioned and the level L of the output voltages of the voltage sources 8i and 8j is L<M and therefore, the step proceeds to step (f), where the level L of the output voltages of the voltage sources 8*i* and 8*j* is set to (L+1). That is, setting in the direction of acceleration by one step is effected, whereafter the step proceeds to step (i).

At step (i), the comparison between the aforementioned time counter in the control unit 7 and a count value N corresponding to the actuation stabilizing time is executed, and since the value T of the time counter is set to T=0 as previously described, the result of the comparison becomes T<N. Accordingly, the step proceeds to step (k). When the step proceeds to step (k), the value T of the time counter (not shown) in the control unit 7 is increased to (T+1), whereafter the step branches off to step (m).

When the step proceeds to step (m), the control unit 7 changes over the open/closed loop change-over device 8*t* to the open loop side, and thereafter renders the voltage sources 8*i* and 8*j* into their ON state (see step (n)). In this state, the change-over device 8*t* is changed over to the open loop side and as a result, the output of the comparator 8*d* is cut off and therefore, independently of the output of the phase comparator 8*d*, the voltage control oscillator 8*g* is oscillating at a self-running frequency $f_o$ (higher than the mechanical resonance frequency $f_r$ of the vibration wave motor). A voltage corresponding to the aforementioned (L+1) in which the signal from the voltage control oscillator 8*g* is set in the voltage source 8*i* is applied to the electrode 6*a* of the vibration wave motor through the voltage source 8*i* and the coil 8*k*. Also, the signal from the oscillator 8*g* is shaped by the A phase comparator 8*b*, whereafter it is input to the shift register 8*c* which shifts by a clock signal N times the above-mentioned frequency $f_o$.

Thereby, a signal shifted by ±90° (±N/4 steps) relative to the input signal is taken out of the register 8*c* and a voltage corresponding to the aforementioned (L+1) set in the voltage source 8*j* is applied to the electrode 6*b* of the vibration wave motor through the switch 8*h* and through the voltage source 8*j* and the coil 8*l*.

By the above-described operation, the output of the oscillator 8*g* is applied to the electrode 6*a* and a signal which is 90° out of phase relative to the applied signal to the electrode 6*a* and corresponds to the aforementioned (L+1) is applied to the electrode 6*b*.

When frequency voltages differing by 90° in phase are applied between the electrodes 6*a* and 6*b* in this manner, standing waves are formed in the A phase and the B phase, respectively, of the piezoelectric element 4, and these are combined together to create a travelling vibration wave, by which the rotor 1 is driven.

Thereafter, the step proceeds to step (b) and therefore, the step makes a round of the route of steps (b)→(c)→(d)→(e)→(f)→(i)→(m)→(n). At this time, the level L of the output voltages of the voltage sources 8*i* and 8*j* is increased by one step to (L+2), and the value of the time counter in the control unit 7 is set to (T+2). Therefore, the vibration wave motor is driven by a voltage corresponding to the aforementioned (L+2), and the rotational speed of the rotor 1 is increased. Again in this case, the change-over device 8*t* is changed over to the open loop side and therefore, the vibration wave motor continues to be driven independently of the output from the electrode 6*s*. That is, the vibration wave motor continues to be driven in the open loop mode.

The step continues to go around the aforementioned route, and the value L of the voltage sources 8*i* and 8*j* increases by one step each time the step makes a round of the aforementioned route and the value T of the time counter also increases by one step each time the step makes a round of the aforementioned route, thereby indicating the lapse of time.

Thereafter, a sufficient time for the operation of the vibration wave motor to become stable elapses and the value T of the time counter in the control unit 7 becomes T=N, and when it is checked at step (i), the step branches off to step (j), where the check-up of the level L of the output voltages of the voltage sources 8*i* and 8*j* is executed. When the level L of the output voltages has reached a closed loop driving voltage level C, the step branches off to step (l).

As a result, the control unit 7 changes over the change-over device 8*t* to the closed loop side and therefore, the output of the phase comparator 8*d* is connected to the voltage control oscillator 8*g* through the change-over device 8*t* and the filter 8*f*, and the control of the vibration wave motor begins to be executed in the closed loop mode. That is, the control based on the output of the electrode 6*s* is executed.

Of course, when the level L of the output voltages is L<C, the step branches off to step (m), and then the step again returns to step (b), and at step (f), an increase in the level of the output voltages is executed In this closed loop mode, the output of the comparator 8*d* is input to the oscillator 8*g* through the change-over device 8*t* and the filter 8*f*, and the output frequency of the oscillator 8*g* is thereafter controlled in conformity with the signal from the output of the comparator 8*d*.

Figure 5:
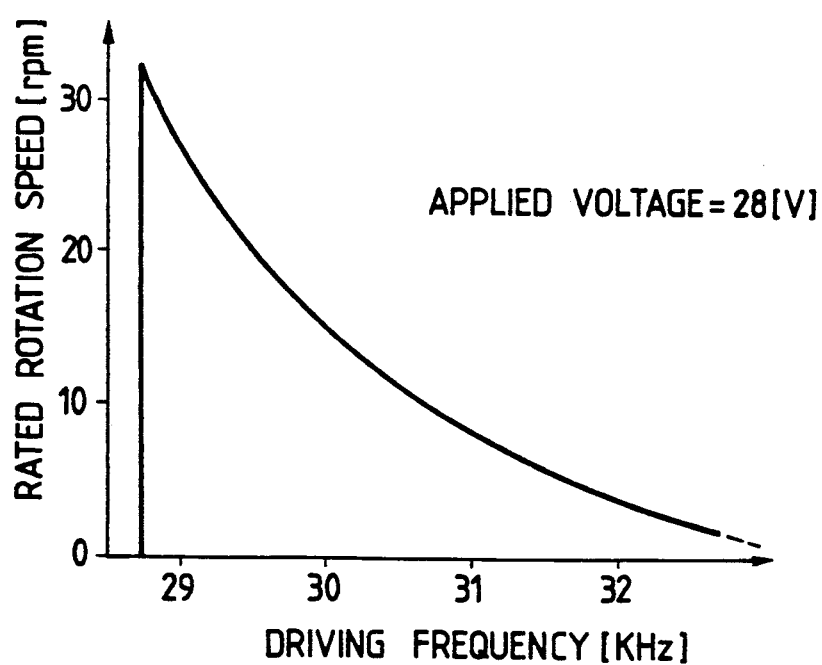
FIG. 5 is a graph showing the frequency vs. number of revolutions characteristic of the vibration wave motor.

In the closed loop mode, the output out of the comparator 8*d* exhibits the output characteristic of FIG. 5. Accordingly, in the closed loop mode, if the output of the electrode 6*s* and the signal of the electrode 6*a* shift by 90° or more relative to each other, the output of the comparator 8*d* assumes a high level to make the frequency of the oscillator 8*g* higher, whereby the signal of the electrode 6*a* is controlled in such a direction that it is more advanced in phase than the output of the electrode 6*s*, i.e., such a direction that the phase difference is 90°, and if the phase difference between the signals of the electrodes 6*s* and 6*a* is within 90°, the output of the comparator 8*d* assumes a low level to thereby reduce the frequency of the oscillator 8*g* and shift the phase difference of 90°. By the above-described operation, in the closed loop mode, the phase difference between the signals of said electrodes is controlled so as to become 90°. That is, so-called PLL control is executed.

When a deceleration instruction signal is given from the control instructing means 9 to the control unit 7 after the vibration wave motor has assumed the above-described stably driven state, the step branches off from step (d) to step (g), where the level L of the output voltages of the voltage sources 8*i* and 8*j* is lowered by one step each as shown at step (h) and thus, the vibration wave motor is gradually decelerated. When the level L of the output voltages becomes L<C, the step branches off to step (m), where the open loop mode is assumed again.

The above-described embodiment has been a case where the level L of the output voltages of the voltage sources 8*i* and 8*j* gradually rises when the vibration wave motor is actuated, but where the level L of the output voltages is set to L=C from the beginning of the actuation of the vibration wave motor, as a matter of course, a similar effect will be obtained even if the vibration wave motor is driven in the closed loop mode (the PLL control system) after the operation of the vibration wave motor has become stable, in other words, immediately after a sufficient time for the output of the S phase electrode 6s to become stable has elapsed.

As described above, the driving in the closed loop mode (the PLL control mode) which is a second driving mode is adopted only when the output of the vibration detecting electro-mechanical energy converting element is stable, and the driving in the open loop mode which is a first driving mode is adopted when said output is unstable and therefore, stable driving control has become possible even when the vibration wave motor is actuated or when the driving voltage is low.

I claim:

1. A vibration wave driven actuator, comprising:
   (a) a vibration member;
   (b) an electro-mechanical energy conversion element provided on said vibration member;
   (c) an application means for applying first and second alternating signals to said energy conversion element, thereby generating a travelling wave in said vibration member as a driving force; and
   (d) a circuit for adjusting the alternating signals applied by said application means, said adjusting circuit having a first mode and a second mode, in the first mode, the frequency of said first and second alternating signals being adjusted on the basis of a driving state of said actuator when a magnitude of the alternating signals exceeds a predetermined level, and in the second mode, the magnitude of the alternating signals being adjusted irrespective of the driving state of said actuator when the magnitude of the alternating signals is below the predetermined level.

2. A vibration wave motor according to claim 1, wherein the first and second alternating signals have a predetermined phase difference with respect to each other.

3. A vibration driven motor, comprising:
   (a) a moving member having a friction surface;
   (b) a vibration member having a friction surface in contact with said friction surface of said moving member for generating a vibration therein in response to an applied electrical signal, thereby causing relative movement between said vibration member and said moving member; and
   (c) control means for controlling a magnitude of said electrical signal irrespective of a driving state of the motor during a predetermined time after starting of the motor, and for controlling the frequency of said electrical signal in accordance with the driving state of the motor after expiration of the predetermined time from starting of the motor.

4. A vibration wave driven actuator, comprising:
   (a) a moving member having a friction surface;
   (b) a vibration member having a friction surface in contact with said friction surface of said moving member for generating a vibration wave therein in response to an applied electrical signal thereby causing relative movement between said vibration member and said moving member; and
   (c) control means for controlling the electrical signal irrespective of a driving state of the actuator during a predetermined time after starting of the actuator, and for controlling the electrical signal in accordance with the driving state of the actuator on the basis of the driving state of the actuator after expiration of the predetermined time.

5. A vibration wave driven actuator, comprising:
   (a) a moving member having a friction surface;
   (b) a vibration member having a friction surface in contact with said friction surface of said moving member for generating a vibration wave therein in response to an applied electrical signal thereby causing relative movement between said vibration member and said moving member; and
   (c) control means for controlling the electrical signal irrespective of a driving state of the actuator during a predetermined time after starting of the actuator, and for controlling the electrical signal in accordance with a driving state of the actuator when the predetermined time has expired and a magnitude of the electric signal exceeds a predetermined level.

6. A vibration driven motor, comprising:
   (a) a moving member having a friction surface;
   (b) a vibration member having a friction surface in contact with said friction surface of said moving member for generating a vibration therein in response to an applied electrical signal, thereby causing relative movement between said vibration member and said moving member; and
   (c) control means for controlling said electrical signal irrespective of a driving state of the motor during a predetermined time after starting of the motor, and for controlling said electrical signal in accordance with the driving state of the motor after expiration of the predetermined time.

7. A vibration wave driven actuator according to claim 1, further comprising a sensing member provided on said vibration member for generating a control signal corresponding to a vibration state representative of the driving state of said actuator.

8. A vibration wave driven actuator according to claim 7, wherein said adjusting circuit adjusts a phase difference between said control signal from said sensing member and one of said alternating signals at a predetermined phase difference.

9. A vibration wave driven actuator according to claim 7, wherein said predetermined phase difference is 90 degrees.

10. A vibration wave driven actuator according to claim 7, wherein said sensing member includes a piezoelectric element.

11. A vibration wave driven actuator, comprising:
    (a) a vibration member;
    (b) an electro-mechanical energy conversion element provided on said vibration member;
    (c) an application means for applying first and second alternating signals to said energy conversion element, thereby generating a travelling wave in said vibration member as a driving force; and
    (d) a circuit for adjusting the alternating signals applied by said application means, said adjusting circuit having a first mode and a second mode, in the first mode, the frequency of said first and second alternating signals being adjusted on the basis of a driving state of said actuator when a magnitude of the alternating signals exceeds a predetermined level after expiration of a predetermined time from starting of the actuator, and in the second mode, the magnitude of the alternating signals being adjusted irrespective of the driving state of said actuator when the magnitude of the alternating signals is below the predetermined level.

12. A vibration wave driven actuator, comprising:
(a) a vibration member having an electro-mechanical energy conversion element for generating a travelling wave thereon in response to applied electrical signals, thereby causing relative movement between said vibration member and a contact member in pressure contact with said vibration member; and
(b) an adjusting circuit having a first mode and a second mode, in the first mode, a vibration magnitude of said vibration member being adjusted on the basis of a driving sate of said actuator when a magnitude of the electrical signals exceeds a predetermined level, and in the second mode, the vibration magnitude of said vibration member being adjusted irrespective of said driving state of said actuator when the magnitude of the electrical signals is below the predetermined level.

13. A vibration wave driven actuator according to claim 12, wherein, in the first mode, the frequency of said electrical signals is adjusted on the basis of the driving state of said actuator when the magnitude of the electrical signals exceeds the predetermined level.

14. A vibration wave driven actuator according to claim 12, wherein, in the second mode, the magnitude of the electrical signals is adjusted irrespective of the driving state of said actuator when the magnitude of the electrical signals is below the predetermined level.

15. A vibration driven actuator, comprising:
(a) a vibration member having an electro-mechanical energy conversion element for generating a vibration therein in response to applied electrical signals, thereby causing relative movement between said vibration member and a contact member in pressure contact with said vibration member; and
(b) an adjusting circuit having a first mode and a second mode, in the first mode, a vibration magnitude of said vibration member being adjusted on the basis of a driving state of said actuator when a magnitude of the electrical signals exceeds a predetermined level, and in the second mode, the vibration magnitude of said vibration member being adjusted irrespective of said driving state of said actuator when the magnitude of the electrical signals is below the predetermined level.

16. A vibration driven actuator according to claim 15, wherein, in the first mode, the frequency of said electrical signals is adjusted on the basis of the driving state of said actuator when the magnitude of the electrical signals exceeds the predetermined level.

17. A vibration driven actuator according to claim 15, wherein, in the second mode, the magnitude of the electrical signals is adjusted irrespective of the driving state of said actuator when the magnitude of the electrical signals is below the predetermined level.

18. A vibration wave driven motor, comprising:
(a) a vibration member having a frictional surface which is in pressure contact with a movable member;
(b) an electro-mechanical energy conversion element provided on said vibration member for generating a travelling wave in said vibration member in response to applied alternating signals, thereby causing relative movement between said vibration member and the movable member;
(c) a sensing member for generating a control signal representative of a state of the travelling wave in said vibration member;
(d) a detecting member for generating a signal representative of a phase difference between the control signal and at least one of said alternating signals;
(e) a first member for adjusting the phase difference to a predetermined value in response to the signal from said detecting member when a magnitude of said at least one alternating signals exceeds a predetermined level; and
(f) a second member for adjusting the magnitude of the alternating signals irrespective of the signals from said detecting member when the magnitude of the alternating signals is below the predetermined level.

19. A vibration driven motor, comprising:
(a) a vibration member having a friction surface which is in friction contact with a contact member;
(b) an electro-mechanical energy conversion element provided on said vibration member for generating a vibration in said vibration member in response to an applied periodic signal, thereby causing relative movement between said vibration member and the contact member;
(c) a sensing member for generating a control signal in accordance with a state of the vibration in said vibration member;
(d) a detecting member for generating a signal in accordance with a phase difference between the control signal and the periodic signal;
(e) a first member for adjusting the phase difference to a predetermined value in response to the signal from said detecting member when a magnitude of the periodic signal exceeds a predetermined level; and
(f) a second member for adjusting the magnitude of the periodic signal irrespective of the signal from said detecting member when the magnitude of the periodic signal is below the predetermined level.

20. A vibration wave driven actuator, comprising:
(a) a moving member having a friction surface;
(b) a vibration member having a friction surface in contact with said friction surface of said moving member for generating a travelling wave therein in response to an applied electrical signal thereby causing relative movement between said vibration member and said moving member; and
(c) control means for controlling a magnitude of the electrical signal irrespective of a driving state of the actuator during a predetermined time after starting of the actuator, and for controlling the frequency of the electrical signal on the basis of the driving state of the actuator after expiration of the predetermined time.

21. A vibration wave driven actuator, comprising:
(a) a moving member having a friction surface;
(b) a vibration member having a friction surface in contact with said friction surface of said moving member for generating a traveling wave therein in response to an applied electrical signal thereby causing relative movement between said vibration member and said moving member; and
(c) control means for controlling a magnitude of the electrical signal irrespective of a driving state of the actuator during a predetermined time after starting of the actuator, and for controlling the frequency of the electrical signal in accordance with a driving state of the actuator when the predetermined time has expired and the magnitude of the electrical signal exceeds a predetermined level.

* * * * *

UNITED STATES PATENT AND TRADEMARK OFFICE
CERTIFICATE OF CORRECTION

PATENT NO. : 5,146,143          Page 1 of 2
DATED : September 8, 1992
INVENTOR(S) : Furutsu It is certified that error appears in the above-identified patent and that said Letters Patent is hereby corrected as shown below:

COLUMN 1

Line 15, "operations" should read --operation--.

Line 33, "spaced," should read --spaced--.

Line 61, "epitome" should be deleted.

Line 62, "of the principle of operation" should read --principle of operation of the--.

COLUMN 2

Line 39, "low has" should read --low. This has--.

COLUMN 4

Line 62, "8jis" should read --8j is--.

UNITED STATES PATENT AND TRADEMARK OFFICE
CERTIFICATE OF CORRECTION

PATENT NO. : 5,146,143

DATED : September 8, 1992

INVENTOR(S) : Furutsu

It is certified that error appears in the above-identified patent and that said Letters Patent is hereby corrected as shown below:

COLUMN 6

Line 28, "executed" should read --executed.---.

Line 48, "difference of 90°." should read --difference between the signals of said electrodes in the direction of 90°.---.

COLUMN 10

Line 12, "signals" (second occurrence) should read --signal--.

Signed and Sealed this

Twenty-eighth Day of September, 1993

Attest:

BRUCE LEHMAN

*Attesting Officer*     *Commissioner of Patents and Trademarks*